United States Patent [19]

Norton

[11] 3,920,670

[45] Nov. 18, 1975

[54] PROCESS FOR HYDROLYSIS OF NITRILES
[75] Inventor: Richard V. Norton, Wilmington, Del.
[73] Assignee: Sun Ventures, Inc., St. Davids, Pa.
[22] Filed: Oct. 10, 1973
[21] Appl. No.: 404,966

[52] U.S. Cl. ... 260/295.5 R; 260/295 R; 260/515 P; 260/515 R; 260/561 R
[51] Int. Cl.² ............... C07D 213/55; C07C 63/04; C07C 63/14
[58] Field of Search ..... 260/295 R, 295.5 R, 515 R, 260/515 P

[56] References Cited
UNITED STATES PATENTS

| | | | |
|---|---|---|---|
| 3,146,238 | 8/1964 | Pennington et al. | 260/295 R |
| 3,155,673 | 11/1964 | Matsumura et al. | 260/295.5 |
| 3,781,343 | 12/1973 | Norton | 260/515 P |

OTHER PUBLICATIONS

Cohen et al., J. Am. Chem. Soc., Vol. 84, pp. 1625–1628, (1962).

Houben–Weyl, Methoden der Organischen Chemie, 4th Ed., Band VIII, Sauerstoffverbindungen III, frontispage and pp. 427–429, Georg Thieme Verlag, Stuttgart, Germany (1952).
Klingsberg, Pyridine and Derivatives, Part III, pp. 179, 197, 232–233, Interscience Publishers, (1962).

*Primary Examiner*—John D. Randolph
*Attorney, Agent, or Firm*—George L. Church; Donald R. Johnson; Paul Lipsitz

[57] ABSTRACT

A process for the catalytic acid hydrolysis of an aromatic or heterocyclic nitrile to acid by feeding an aqueous solution of the nitrile and acid catalyst to a reflux reactor held at a temperature and pressure to maintain liquid reflux conditions whereby hydrolysis of nitriie occurs and the ammonium salt of the acid catalyst which forms pyrolyzes to amide, distilling off vapors of said catalyst and the amide of said catalyst, and separating from said reactor aromatic acid or heterocyclic acid product in high purity.

10 Claims, No Drawings

PROCESS FOR HYDROLYSIS OF NITRILES

This invention relates to the acid catalyzed hydrolysis of aromatic nitriles to the corresponding acids and the invention provides such hydrolysis in a continuous, highly efficient manner. In accord with the invention, an aqueous solution of an aromatic or heterocyclic nitrile and the acid catalyst are fed into a reflux type reactor having essentially plug flow conditions which is held at a temperature and pressure to maintain liquid reflux conditions (e.g., 150° to 330°C. preferably 250–300°C.), whereby hydrolysis of nitrile occurs and the ammonium salt of the acid catalyst which forms is pyrolyzed under the conditions within the reactor, vapors of acid catalyst and amide of said catalyst which are pyrolysis products are distilled off, and there is separated from said reactor the aromatic acid or heterocyclic acid product. It will be understood that no pressure control is needed, the pressure of the system being autogenous under the temperature conditions employed. Optionally, in order to operate in an efficient and continuous manner, the acid catalyst and water which are distilled off may be returned to the reactor. This is readily achieved by cooling the overhead vapors, separating off the solid amide which forms, and returning the aqueous solution of the catalyst to the reactor.

It will be helpful in understanding the invention to note the chemical reactions which occur in the equilibrium hydrolysis of the aromatic nitrile, for example benzonitrile, the equilibrium reaction will yield a mixture of benzamide and ammomium benzoate, as follows:

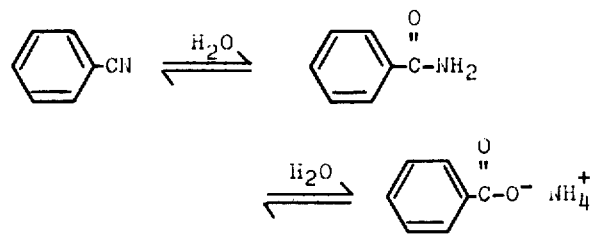

In the presence of an acid e.g., acetic, and generally in an amount of 0.25 to 20 moles per mole of CN group, preferably about a 5:1 ratio, the ammonium salt is in equilibrium with free aromatic acid and ammonium acetate:

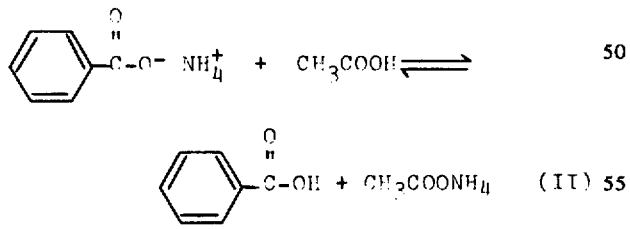

While the above series of reactions are occuring in the equilibrium reactor a pyrolytic dehydration of the ammonium acetate occurs in an aqueous system.

The acetamide formed has a sufficiently high vapor pressure so that it is effectively removed from the system by its distillation with the acetic acid and water taken overhead. The overall chemical reaction of the process is:

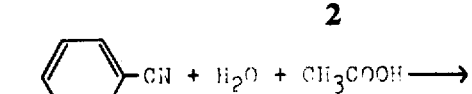
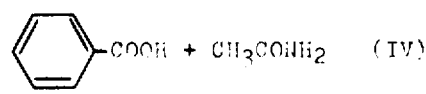

Thus, the nitrile is efficiently converted to its corresponding acid, and, unexpectedly, acetamide is distilled from an aqueous hydrolysis reactor.

The process is applicable to a wide variety of aromatic and heterocyclic mono- and polynitriles such as benzonitrile, toluonitrile, phthalonitrile, isophthalonitrile, terephthalonitrile, 1,3,5-tricyanobenzene, 2,6-dicyanonaphthalene, nicotinonitrile, and other heteroaromatic nitrile compounds of the benzene and naphthalene series; e.g., the benzo-, toluo- and phthalonitriles, most preferably iso- and terephthalonitriles and 2,6- or 2,7-dicyanonaphthalene.

The acid catalyst used in the process will be any water soluble acid whose ammonium salt may be readily dehydrated under the reflux conditions used in the process. Also the acid catalyst should have an appreciable rate of hydrolysis and its amide should have a vapor pressure greater than the aromatic acid or heterocyclic acid being formed. Most preferably, acetic acid will be the acid used, but other preferred operable acids include lower aliphatic acids of 1 to 4 carbon atoms and benzoic acid.

In order to further illustrate the invention the following examples are given:

EXAMPLE 1

A slurry of terephthalonitrile (1 mole), acetic acid (5 moles) and water (500 ml.) was hydrolyzed at 250°C. for 3 hours. A constant volume single plate distillation was then started using a feed of acetic acid:water (1:5 molar ratio) at 250°C. The condensed distillate was concentrated and acetamide isolated by filtration. From 12 l. of distillate 1.8 moles of acetamide were removed (90% of theory), and from filtration of the reactor slurry at 100°C, terephthalic acid was isolated (161 g. 0.97 moles) containing 0.01% N as terephthalamic acid.

EXAMPLE 2

A slurry of isophthalonitrile (0.1 moles) acetic acid (0.4 moles) and water (400 ml.) was hydrolyzed at 250C. for 3 hours. A constant volume single plate distillation was then started using a feed of acetic acid:water (1:4 mole ratio) at 250°C. The condensed distillate was concentrated and acetamide isolated by filtration. From 10 l. of distillate, acetamide (0.17 moles, 85% of theory) was isolated and filtration of the reactor slurry at 50°C. gave isophthalic acid (14.3 g, 86%) containing 0.07% N as isophthalamic acid.

EXAMPLE 3

In a manner similar to Examples 1 and 2, 2,6-dicyanonaphthalene, (0.50 moles) in 100 ml. of water and hydrolyzed at 280°C. for 10 hours. Subsequently, a constant volume single plate distillation using a feed of acetic acid:water (10:1 mole ratio) at 250°C. yielded acetamide and 2,6-napthalene dicarboxylic acid in 85% yield containing 0.02% N as amide impurity.

EXAMPLE 4

In the manner of Example 3, nicotinonitrile was allowed to react with propionic acid, and after hydrolysis and distillation, nicotinic acid was isolated in high yield.

1. A process for the catalytic acid hydrolysis of an aromatic or heterocyclic nitrile to the corresponding acid which comprises heating an aqueous solution of a nitrile from the group consisting of nitriles of the benzene, naphthalene and heterocyclic series and an acid catalyst which has an appreciable rate of hydrolysis and whose amide has a vapor pressure greater than the nitrile derived acid product, said heating being carried out in a reactor held at a temperature and pressure to maintain liquid reflux conditions, whereby hydrolysis of the nitrile occurs and the ammonium salt of the acid catalyst which forms is pyrolyzed to amide, distilling off vapors of said acid catalyst and the amide, and separating from said reactor the corresponding aromatic or heterocyclic acid products in high purity.

2. The process of claim 1 where the nitrile is an aromatic nitrile of the benzene or naphthalene series and the acid catalyst is acetic acid.

3. The process of claim 1 where the nitrile is a heterocyclic nitrile containing 4 to 5 carbon atoms and the acid catalyst is acetic acid.

4. The process of claim 3 where the nitrile is nicotinonitrile.

5. A process for the catalytic acid hydrolysis of an aromatic nitrile of the benzene or naphthalene series which comprises refluxing under autogenous pressure in a reflux reactor, an aqueous solution of the nitrile and as catalyst a lower aliphatic acid of 1 to 4 carbon atoms at a temperature of 150° to 330°C. whereby hydrolysis of the nitrile occurs and the ammonium salt of the acid catalyst which forms is dehydrated by pyrolysis to the corresponding amide, distilling off vapors of said acid catalyst and said amide, and separating from said reactor the corresponding aromatic acid product in high purity.

6. The process of claim 5 where the aromatic nitrile is terephthalonitrile and the acid catalyst is acetic acid.

7. The process of claim 5 where the aromatic nitrile is isophthalonitrile and the acid catalyst is acetic acid.

8. The process of claim 5 where the aromatic nitrile is 2,6-dicyanonaphthalene and the acid is acetic acid.

9. The process of claim 5 where the acid catalyst which is distilled off is returned to the reflux reactor.

10. The process of claim 9 where the aromatic nitrile is terephthalonitrile and the acid catalyst is acetic acid.

* * * * *